United States Patent [19]

Nathan

[11] 3,846,872

[45] Nov. 12, 1974

[54] SPECTACLE CASE

[75] Inventor: Emanuel Nathan, South Orange, N.J.

[73] Assignee: Opticase, Inc., Rockaway, N.J.

[22] Filed: Mar. 26, 1973

[21] Appl. No.: 344,992

Related U.S. Application Data

[62] Division of Ser. No. 201,329, Nov. 23, 1971, Pat. No. 3,749,231.

[52] U.S. Cl. .................................................. 24/3 G

[51] Int. Cl. ............................................ B43k 25/00

[58] Field of Search ............... 24/3 H, 3 G, 3 J, 3 L, 24/5, 13, 11 F, 227; 206/5 R

[56] References Cited

UNITED STATES PATENTS

| | | | |
|---|---|---|---|
| 1,315,768 | 9/1919 | Fulgora | 24/3 L |
| 1,808,779 | 6/1931 | Larsen | 24/11 F |
| 1,874,110 | 8/1932 | Mays | 24/11 F |
| 1,904,212 | 4/1933 | Esterow | 24/11 F |
| 1,923,269 | 8/1933 | Larsen | 24/11 F |
| 1,993,734 | 3/1935 | Edelheit | 24/227 UX |
| 2,102,218 | 12/1937 | Rakauskas | 24/11 F |

*Primary Examiner*—Donald A. Griffin
*Attorney, Agent, or Firm*—Rudolph J. Jurick

[57] ABSTRACT

A flexible spectacle case provided with a pocket clip of the type normally used on pocket pens.

1 Claim, 7 Drawing Figures

SPECTACLE CASE

This application is a division of application Ser. No. 201,329, filed Nov. 23, 1971, now Pat. No. 3,749,231.

BACKGROUND OF THE INVENTION

Various clip arrangements have heretofore been incorporated in a spectacle case for the purpose of retaining the case securely in the wearers pocket. In general, the prior clip arrangements are either of complex and costly construction or they detract from the appearance of the spectacle case. A pocket clip constructed and arranged in accordance with this invention is of simple, inexpensive construction, enhances the appearance of the case and is particularly adapted for use on flexible spectacle cases.

SUMMARY OF THE INVENTION

A patch of flexible material, secured between a conventional pocket clip and a rigid backing plate, is heat-sealed or sewn to the outer surface of flexible spectacle case. The patch of material may be suitably embossed and of a selected configuration, thereby to enhance the appearance of the case.

An object of this invention is the provision of pocket clip assembly particularly adapted for use on a flexible spectacle case.

An object of this invention is the provision of a flexible spectacle case provided with a pocket clip such as is normally used on pocket pens.

An object of this invention is the provision of spectacle case made of flexible material and carrying a pocket clip, the pocket clip and a rigid backing plate being secured to a patch of flexible material which is heat-sealed to the case.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF PREFERRED EMBODIMENT

Figure 1:
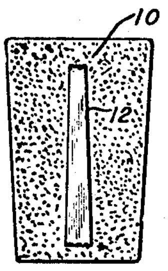
FIGS. 1 – 3 are, respectively, front, side and rear elevational views of the pocket clip and backing plate assembled to a patch of flexible material.

Referring to FIGS. 1 – 4, a patch 10 of flexible material such as, for example, polyvinylchloride or leather, is positioned between a metal backing plate 11 and a pocket clip 12 of the type normally used on pocket pens. The clip is provided with two integral prongs 13 and 14, which pass through the patch 10 and a backing plate 11. The projecting ends of the prongs are crimped over, whereby these three members are secured together and form an assemblage. By using suitable dies, the prongs of the clip are pierced through the patch and the backing plate. Alternatively, the prongs of the clip may be pierced through the patch and pressed through slotted openings pre-formed in the backing plate. Longitudinally-extending ribs or flutes 15 and 16 may be pressed or rolled into the backing plate, thereby to reduce the thickness of the plate while providing the necessary rigidity for the proper functioning of the clip.

Figure 2:
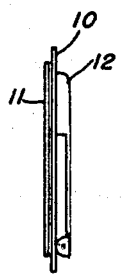
Figure 3:
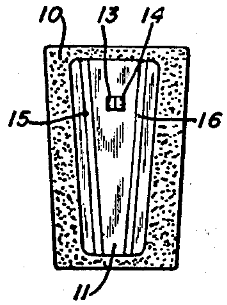
Figure 4:
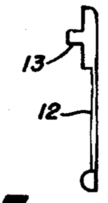
FIG. 4 is a side elevational view of the pocket clip.
Figure 6:
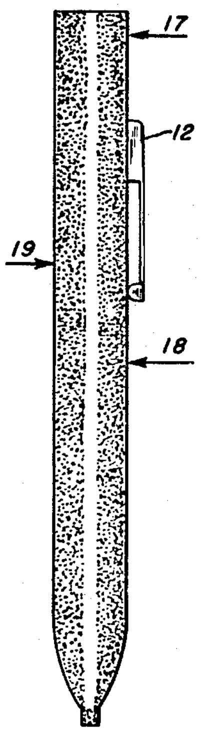
FIG. 6 is a corresponding left side elevational view.
Figure 5:
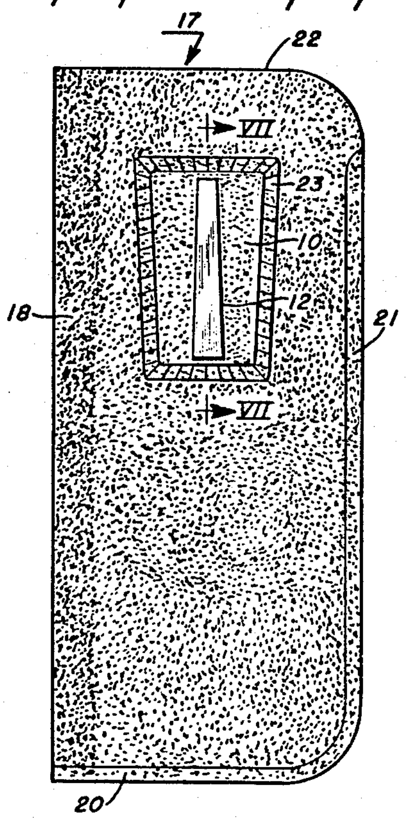
FIG. 5 is a front elevational view of the complete spectacle case.
Figure 7:
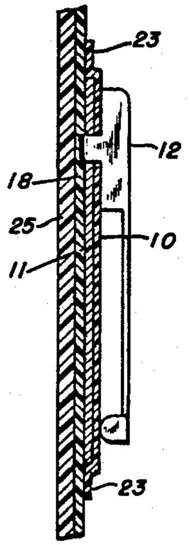
FIG. 7 is a cross-sectional view taken along the line VII — VII of FIG. 5 and drawn to an enlarged scale.

The described assemblage is adapted for attachment to a spectacle case 17 as shown in FIGS. 5 and 6, such case being formed in a conventional manner. For example, the case may be formed from a single sheet of flexible plastic, that is, the sheet is folded — back upon itself to form the case front and back 18 and 19, respectively, after which aligned edge portions are heat-sealed or sewn together to form the case bottom and side 20 and 21 respectively. The open top of the case is indicated by the numeral 22. Prior to the formation of the case, the assemblage of FIGS. 1 – 3 is placed in proper position on the plastic sheet and the marginal edge portions of the patch 10 are heat-sealed to the underlying portions of the sheet by means of a suitable tool. Alternatively, the case may be formed of two separate, matching pieces of material which are heat-sealed or stitched along the two sides and the bottom. In either case, the clip 12 is carried by the front of the case and the backing plate 11 is cofined between the patch 10 and the case front 18, see FIG. 7. In FIG. 7, the numeral 25 identifies a conventional inner case liner made of appropriate material to minimize scratching of the eyeglass lenses.

The tool used for attaching the pocket clip assemblage to the front of the spectacle case may have a selected configuration and the forward face of the tool which is brought into contact with the patch 10 may be provided with a design, all for the purpose of enhancing the appearance of the completed case. More specifically, the design shown in FIG. 5 was formed by a tool having a generally keystone configuation and the forward face of such tool included closely-spaced grooves which resulted in the line effect appearing along the marginal edges 23 of the patch 10. Also, the case and the patch may be made of polyvinylchloride of different colors and suitably embossed. While the heat-sealing of the pocket clip assemblage to the spectacle case is preferred, it will be apparent such assemblage may be sewn to the case.

Having now described the invention what I desire to protect by Letters Patent is set forth in the following claims.

1.

An assemblage comprising, a - a patch of flexible material having a generally rectangular configuration, b - a rigid backing member disposed on one side of said patch, said backing member having edges spaced inwardly from and proximate to the edges of said patch, and c - a pocket clip disposed on the other side of said patch, said clip having integral prongs passing through the patch and backing member with the end portions of said prongs being offset into engagement with a surface of the backing member; the recited assemblage being attachable to a relatively flat surface by means of the marginal edge portions of the patch which extend beyond the edges of the backing member.

* * * * *